United States Patent [19]
Hatanai et al.

[11] Patent Number: 5,675,454
[45] Date of Patent: *Oct. 7, 1997

[54] FLOATING TYPE MAGNETIC HEAD APPARATUS

[75] Inventors: Takashi Hatanai, Nagaoka; Akira Takahashi, Mitsuke, both of Japan

[73] Assignee: Alps Electric Co., Ltd., Tokyo, Japan

[*] Notice: The term of this patent shall not extend beyond the expiration date of Pat. No. 5,467,236.

[21] Appl. No.: 551,993

[22] Filed: Nov. 2, 1995

Related U.S. Application Data

[63] Continuation of Ser. No. 274,670, Jul. 13, 1994, Pat. No. 5,467,236.

[30] Foreign Application Priority Data

Jul. 15, 1993 [JP] Japan .................................. 5-197997

[51] Int. Cl.[6] .......................... G11B 5/48; G11B 21/20
[52] U.S. Cl. ................................... 360/104; 360/103
[58] Field of Search ............................. 360/104, 103

[56] References Cited

U.S. PATENT DOCUMENTS

| | | | |
|---|---|---|---|
| 4,167,765 | 9/1979 | Watrous | 360/103 |
| 4,724,500 | 2/1988 | Daiziel | 360/103 |
| 5,008,768 | 4/1991 | Carlson et al. | 360/104 |
| 5,027,238 | 6/1991 | Konishi et al. | 360/104 |
| 5,138,507 | 8/1992 | Zaroui et al. | 360/104 |
| 5,223,997 | 6/1993 | Uemura et al. | 360/103 |
| 5,333,085 | 7/1994 | Prentice et al. | 360/104 |
| 5,467,236 | 11/1995 | Hatanai et al. | 360/104 |

*Primary Examiner*—John H. Wolff

[57] ABSTRACT

A spherical projection portion for pivotally supporting a magnetic head is protrusively formed in a tongue piece formed in a flexure, and a non-contact portion with the slider are formed on both sides of the projection portion. The backward portion with the projection portion and the non-contact portion as a boundary is formed into a bonding portion. A bonding agent between the bonding portion and the slider is prevented from flowing toward a magnetic conversion element by the projection portion and the non-contact portion. Since the bonding agent is not present in the vicinity of the magnetic conversion element, the magnetic conversion element is not deformed due to the expansion and contraction of the hardened bonding agent. Also, since the bonding area is formed into an appropriate dimension, the protuberance dimension of a crown of the slider is not varied.

2 Claims, 7 Drawing Sheets

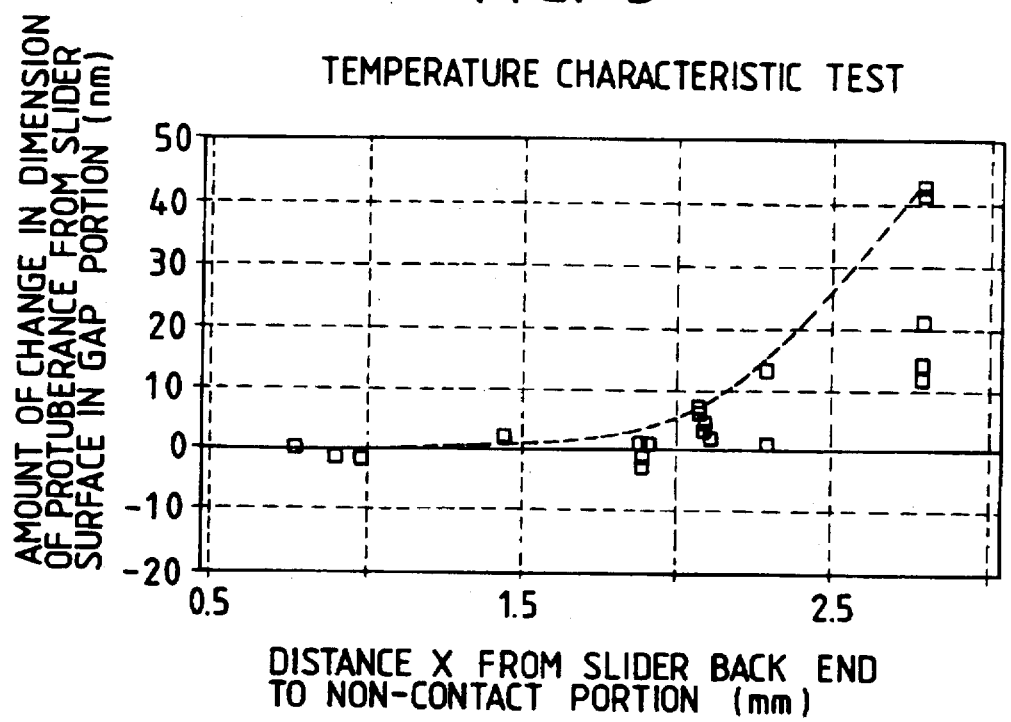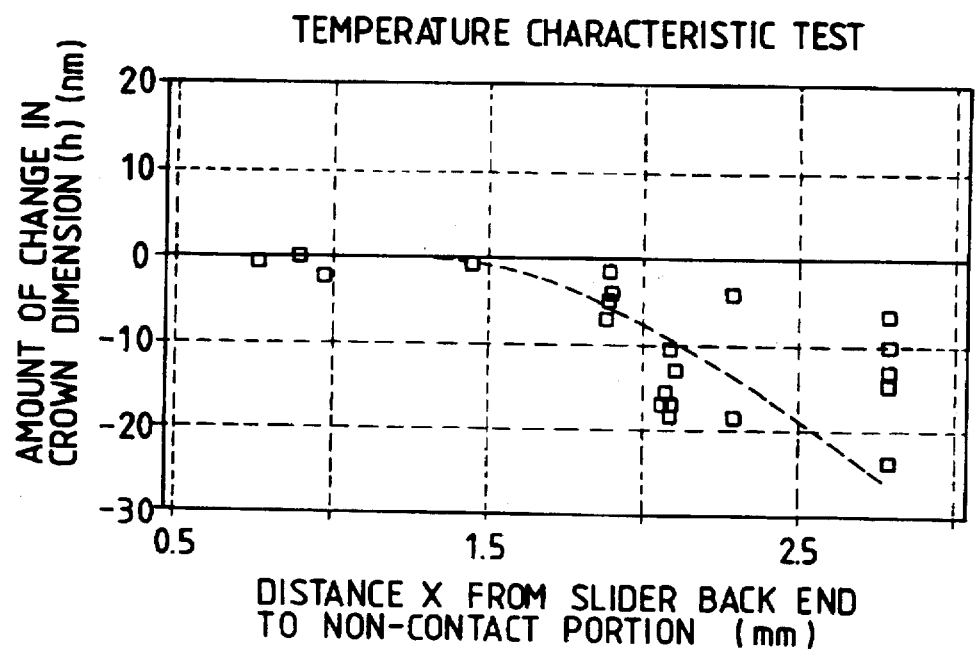

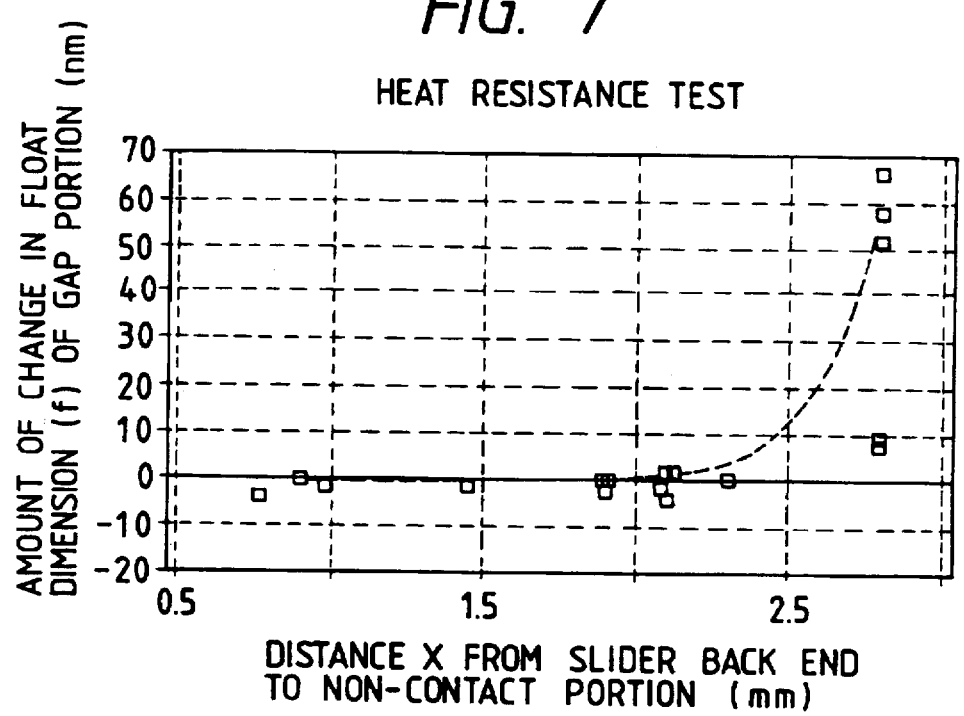
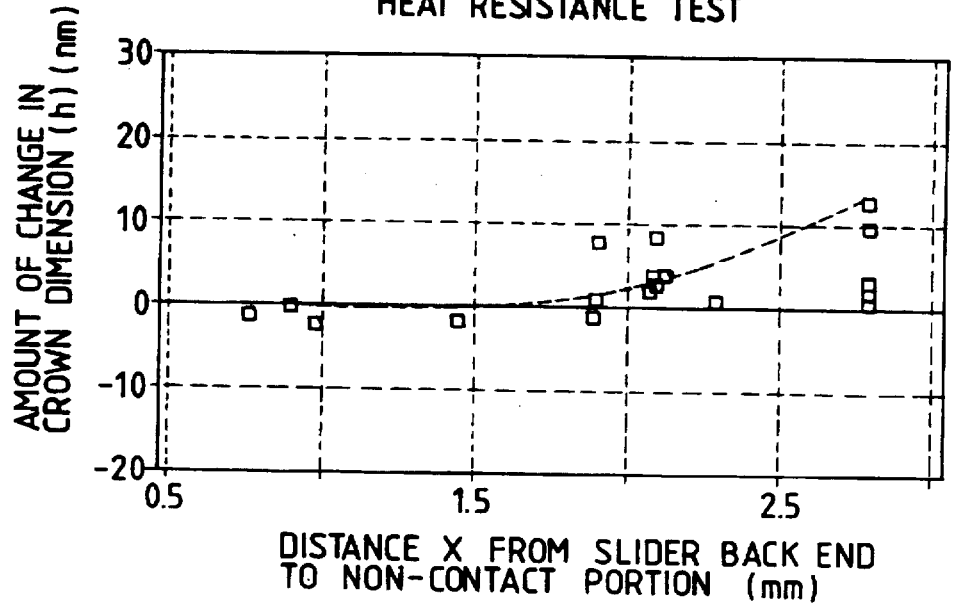

FLOATING TYPE MAGNETIC HEAD APPARATUS

This application is a continuation of application Ser. No. 08/274,670, filed Jul. 13, 1994 now U.S. Pat. No. 5,467,236.

BACKGROUND OF THE INVENTION

1. Field of the Invention

The present invention relates to a floating type magnetic head having a magnetic conversion element provided in one end surface of a slider which is bonded and fixed to a tongue piece of a support mechanism. More particularly, the present invention relates to a floating type magnetic head apparatus which is capable of preventing a slider or the magnetic conversion element from being deformed by a bonding agent for bonding the slider.

2. Description of the Related Art

FIG. 10 is a side view illustrating a conventional example of a floating type magnetic head apparatus for use in a hard disk or the like. FIG. 11 is an exploded perspective view illustrating a slider and a core of the floating type magnetic head apparatus shown in FIG. 10. FIG. 12 is a bottom view illustrating a support mechanism in a state in which the slider is not mounted.

The floating type magnetic head apparatus shown in FIG. 10 comprises a slider 1, an I-shaped core 2, and a support mechanism for supporting the slider 1.

As shown in FIG. 11, protuberances 4 and 5 are monolithically molded at a front 1a of the slider 1. The I-shaped core 2 is bonded to the front end surfaces of the protuberances 4 and 5 by a bonding agent made of a non-magnetic substance such as a glass material. The joined portion of the protuberance 5 and the lower portion of the core 2 forms a gap G. As shown in FIG. 10, a coil C is wound around the core 2, and a groove 1b is formed at the front 1a of the slider 1. The space between the protuberance 4 and the protuberance 5, and the interior of the groove 1b serve as a space for winding the coil C.

Two rows of grooves 1c and 1c are formed on the lower surface of the slider 1 along the sliding movement of a disk. The two sides of the grooves 1c and 1c are formed into rail surfaces 1e, and a narrow rail surface 1f is formed in the boundary between the grooves 1c and 1c. Although the slider 1 floats slightly by an air flow above the disk when the disk rotates, the amount of floating of the gap G from the disk is adjusted to the most appropriate distance by the depth of the grooves 1c and 1c and the surface areas of the rail surfaces 1e and 1f.

As indicated by a dotted line, each of the rail surfaces 1e and 1f is formed into a nearly circumferential surface of a large radius which is curved along the sliding movement of the disk. The protuberance formed by the circumferential surface is generally called a crown. The dimension h of the protuberance in the central portion of the crown from the under surface of the slider is approximately 45 nm when the total length of the slider 1 is, for example, 2.8 mm. The provision of such a crown makes it possible to prevent the slider 1 from closely contacting the surface of the disk when the disk stops.

The support mechanism 13 shown in FIG. 12 comprises a mount 9 fixed to a head drive mechanism of a hard disk unit or the like, and a load beam 8 mounted in the mount 9. Both sides of the load beam 8 are formed of a plate spring of bent pieces 8a and 8a. A flexure 17 formed of a thin plate spring is mounted in the under surface of the tip portion of the load beam 8. A tongue piece 6 which is surrounded by a cutout 7b is integrally formed in the flexure 17, and the slider 1 is bonded and fixed to the tongue piece 6. As shown in FIG. 10, a spherical projection 10 protruding to a side opposite to the side on which the slider 1 is bonded, is formed in the nearly central portion of the tongue piece 6. The projection 10 is brought into contact with the lower surface of the load beam 8 so that it is pivotally supported.

A base portion 8b of the load beam 8 is able to be elastically deformed. The slider is pressed against the surface of the hard disk by a small force by an elastic force exhibited by the base portion 8b. The tongue piece 6 is able to move a little with the projection 10 as a fulcrum. With such a construction, it is possible for the lower surface of the slider 1 to follow a fluctuation of the disk surface.

In the floating type magnetic head apparatus, the slider 1 is bonded to the tongue piece 6 by a resin type bonding agent 11. Since the slider 1 is a very small part, the bonding agent 11 flows to the top surface of the tip portion 1d of the slider 1, or to the top surface of the protuberance 4 and sometimes further to the top surface 2a of the I-shaped core 2. Since the tip portion 1d of the slider 1 is liable to be deformed because the groove 1b is formed under the tip portion 1d, and the narrow protuberance 4 is more liable to be deformed. Therefore, if the bonding agent which flows to these portions is hardened, after which the hardened bonding agent expands or contracts due to a change in the temperature, the tip portion 1d of the slider 1 and also the protuberance 4 are deformed. Furthermore, if the bonding agent flows to the top surface 2a of the core 2, the core 2 is pressed or pulled in a direction in which it is deviated from the protuberance 4.

When, due to the above phenomenon, the gap G portion protrudes and shifts in the direction of the disk with respect to the lower surface of the slider 1, the gap between the gap G and the disk surface becomes too short when the slider 1 floats from the disk, problems occur, for example, the disk is damaged or the magnetic head is damaged. When, conversely, the gap G portion protrudes and shifts upward in the figure from the under surface of the slider 1, the gap between the gap G and the disk surface becomes too wide when the slider 1 floats from the disk, exerting an influence upon a recording or reproducing operation. Such a phenomenon becomes conspicuous as the amount of the bonding agent 11 which flows to the front of the slider 1 becomes larger. The above-described phenomenon becomes more conspicuous in a case in which the bonding agent flows to the top surface of the protuberance 4 than a case in which the bonding agent remains on the top surface of the tip portion 1d. In addition, when the bonding agent 11 flows to the top surface 2a of the I-shaped core 2 or to the side of the protuberance 4 and the I-shaped core 2, the phenomenon becomes conspicuous even more.

Also, the bonding area by the bonding agent 11 which is provided between the slider 1 and the tongue piece 6 must be an appropriate one. When the bonding area is too small, the bonding strength between the slider 1 and the tongue piece 6 decreases. However, if conversely the bonding area is too large, the slider 1 is given a bending stress due to the contraction or expansion of the hardened bonding agent, causing the protuberance dimension h in the center of the above-described crown to vary. This variation of h affects the amount of floating of the gap G from the disk.

Thus, it is conceivable that as shown in FIG. 13, a recess portion 1g extending along the width on the top surface of the slider 1, or as shown in FIG. 14, a recess portion 6a, is formed on the under surface of the tongue piece 6 so that the flow of the bonding agent 11 is prevented by the recess portion 1g or 6a in order to prevent the bonding agent 11 from flowing toward the top surface 2a of the core 2, and the bonding area is adjusted by the bonding agent 11.

However, since the slider 1 is formed of ferrite or the like, there is the possibility that the slider 1 may be damaged when the recess portion 1g is formed, and the operation for forming the recess portion 1g becomes complex. Also, since the tongue piece 6 is a thin plate member having a thickness of approximately 40 μm, its strength decreases if the recess portion 6a is formed, the tongue piece must be etched to form the recess portion 6a, the forming operation is complicated, and the costs are increased.

In addition to the magnetic head shown in FIGS. 10 and 11, a bonding agent exerts an influence upon the magnetic head in which a magnetic conversion element is formed on one end surface of the slider by thin film formation technology.

SUMMARY OF THE INVENTION

The present invention solves the above-described problems of the prior art. It is an object of present invention to provide a floating type magnetic head apparatus in which an obstruction section for preventing a bonding agent between a slider and a tongue piece from flowing toward a magnetic conversion element easily and without decreasing the strength of the tongue piece, and also the bonding area can be set at an appropriate one.

According to the present invention, there is provided a floating type magnetic head apparatus comprising a magnetic head having a magnetic conversion element provided on one end surface of a slider and a support mechanism having a tongue piece to which the slider is bonded, wherein a projection portion which is pivotally supported in a part of the support mechanism and a non-contact portion with the slider, which is continuous with the projection and extends along the width of the tongue piece, are formed in the tongue piece, and the area opposite to the magnetic conversion element is a bonding area between the tongue piece and the slider with the non-contact portion as a boundary.

In the above-described means, a non-contact portion which is continuous the projection is formed in the tongue piece. The bonding agent present between the slider and the tongue piece is obstructed by the projection and the non-contact portion so that the bonding agent is prevented from flowing toward the magnetic conversion element. This non-contact portion can be formed by cutting a tongue piece at the same time when the outer shape of the tongue piece is formed, or can be bent and formed at the same time when the projection is formed. The non-contact portion with the slider makes it possible to prevent the bonding agent from flowing toward the magnetic conversion element, causing the bonding agent not to be present in the vicinity of the magnetic conversion element. Thus, it is possible to prevent the magnetic conversion element from being deformed due to the expansion or contraction of the hardened bonding agent. Since the projection exerts an influence upon the support balance of the magnetic head, the projection is formed in the central portion of the magnetic head or at a position slightly more toward the magnetic conversion element side than the central portion. Therefore, by regulating the bonding area by the projection and the non-contact portion which is continuous with the projection, it is possible to the make the bonding area between the slider and the tongue piece an appropriate area. As a result, the bending stress imparted to the slider due to the expansion or contraction of the hardened bonding agent is not increased, preventing the protuberance dimension of the crown from varying.

The above and further objects, aspects and novel features of the invention will more fully appear from the following detailed description when the same is read in connection with the accompanying drawings. It is to be expressly understood, however, that the drawings are for the purpose of illustration only and are not intended to limit the invention.

BRIEF DESCRIPTION OF THE DRAWINGS

FIG. 5 is a diagram illustrating the relationship between the position of a non-contact portion and the amount of change in the protuberance dimension of a magnetic gap in a temperature characteristic test;

FIG. 6 is a diagram illustrating the relationship between the position of a non-contact portion and the amount of change in the crown dimension in the temperature characteristic test;

FIG. 7 is a diagram illustrating the relationship between the position of the non-contact portion and the amount of change in the floating of the magnetic gap before and after a heat resistance test;

FIG. 8 is a diagram illustrating the relationship between the position of the non-contact portion and the amount of a change in the crown dimension before and after the heat resistance test;

DESCRIPTION OF THE PREFERRED EMBODIMENTS

Preferred embodiments of the present invention will be explained below with reference to the accompanying drawings.

Figure 1:
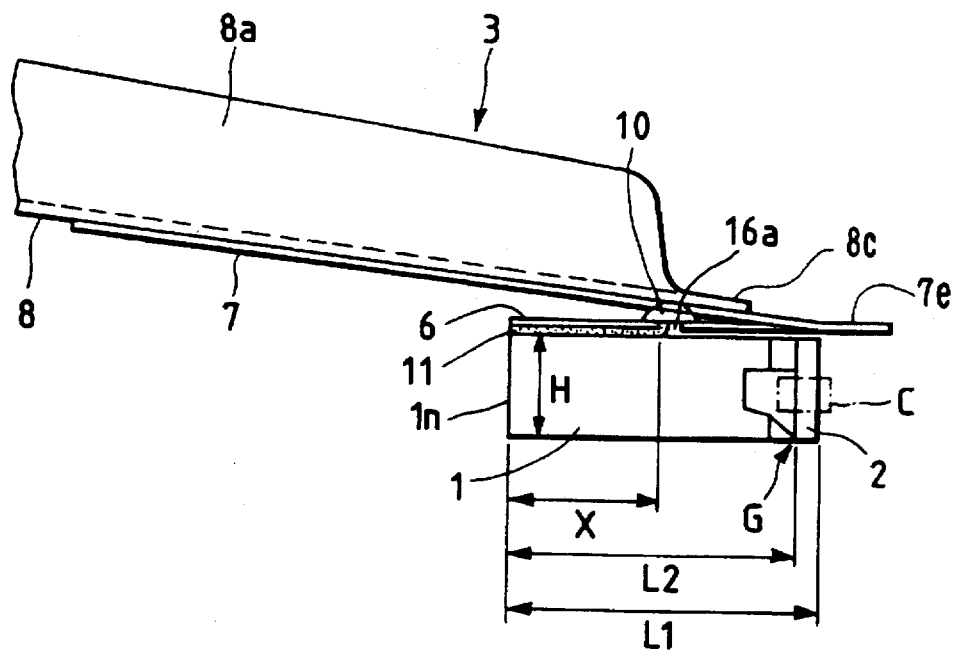
FIG. 1 is a side view illustrating a first embodiment of a floating type magnetic head apparatus of the present invention.
Figure 2:
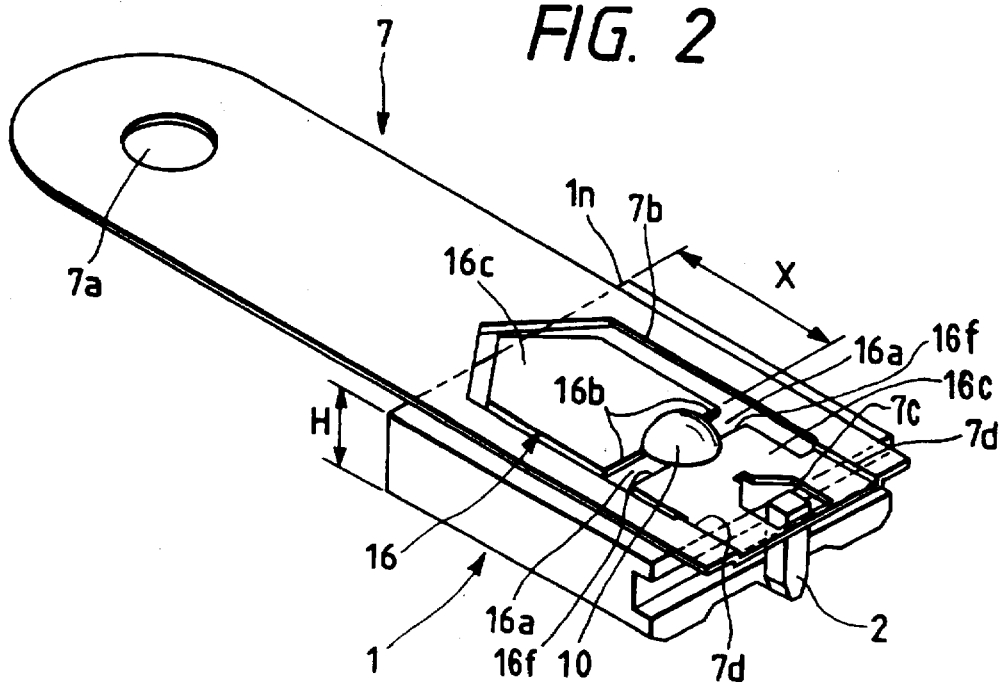
FIG. 2 is a perspective view of a joined portion of a flexure and a magnetic head.
Figure 3:
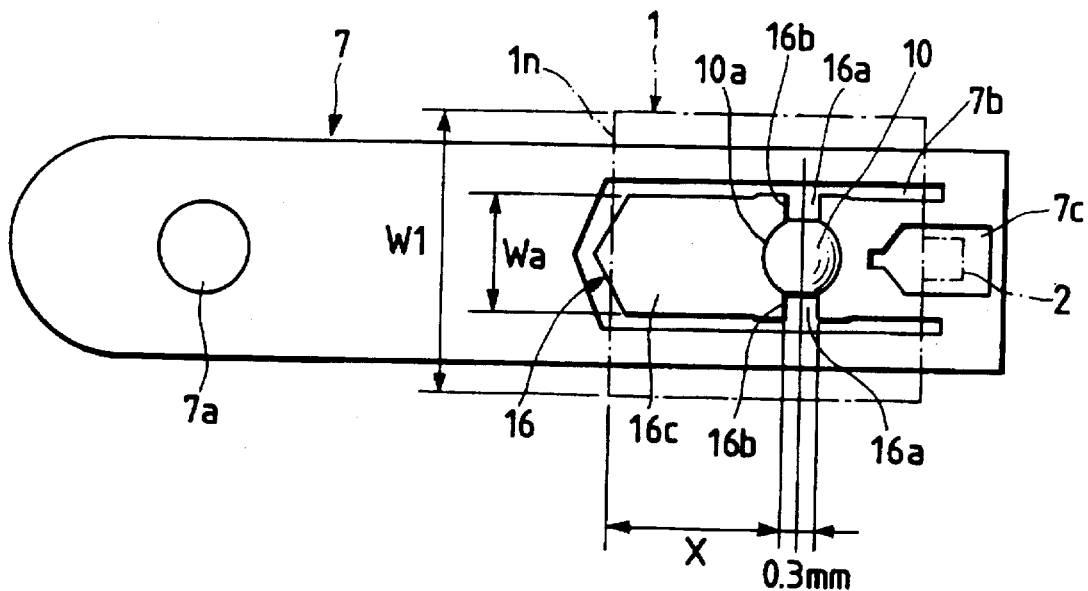
FIG. 3 is a plan view illustrating a flexure single body.
Figure 4:
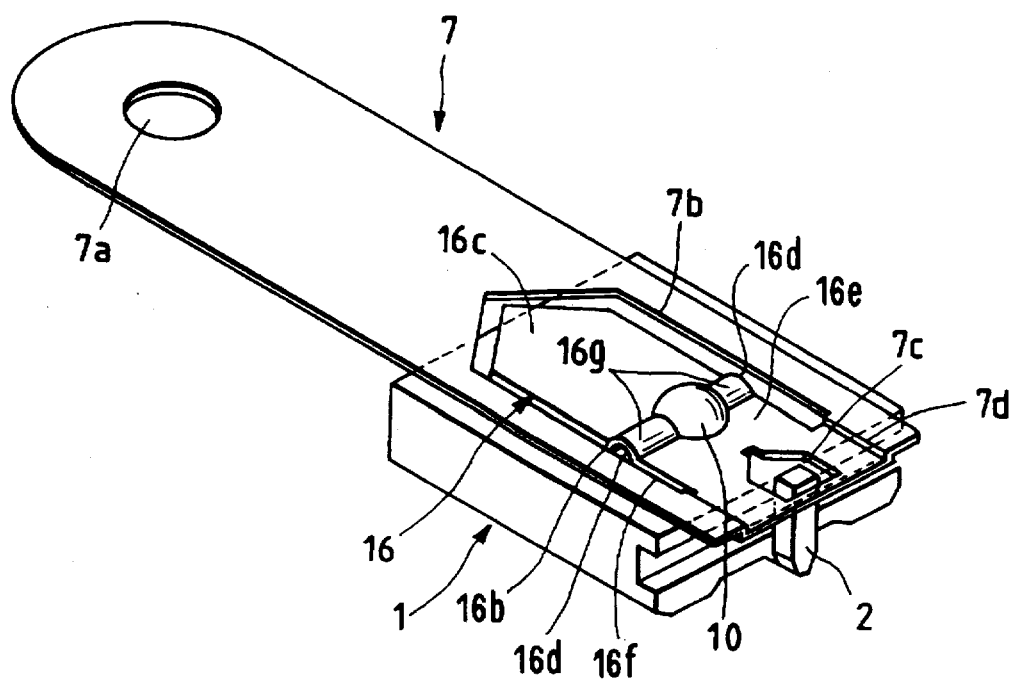
FIG. 4 is a perspective view illustrating a joined portion of a flexure and a magnetic head in accordance with a second embodiment of the present invention.

FIG. 1 is a side view illustrating a first embodiment of a floating type magnetic head apparatus of the present invention. FIG. 2 is a perspective view of a joined portion of a flexure and a magnetic head. FIG. 3 is a plan view illustrating a flexure single body. FIG. 4 is a perspective view illustrating a joined portion of a flexure and a magnetic head in accordance with a second embodiment of the present invention.

Figure 10:
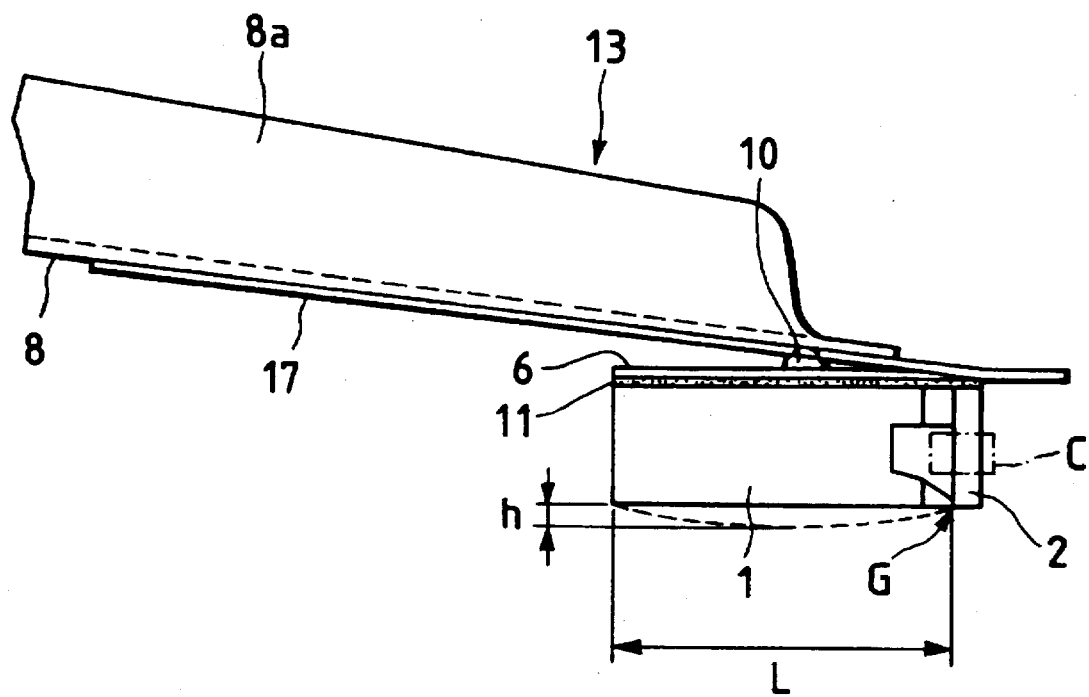
FIG. 10 is a partial side view illustrating a conventional example of a floating type magnetic head apparatus.
Figure 12:
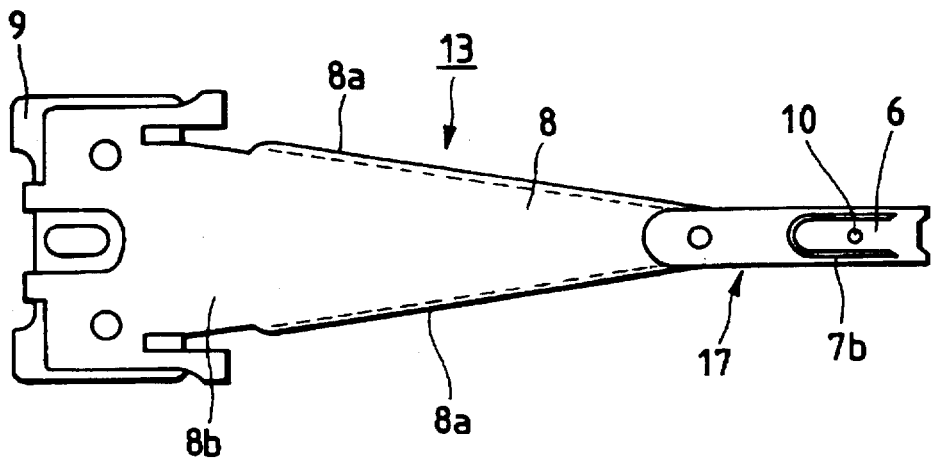
FIG. 12 is a bottom view illustrating a support mechanism shown in FIG. 11 in a state in which the slider is not bonded.
Figure 13:
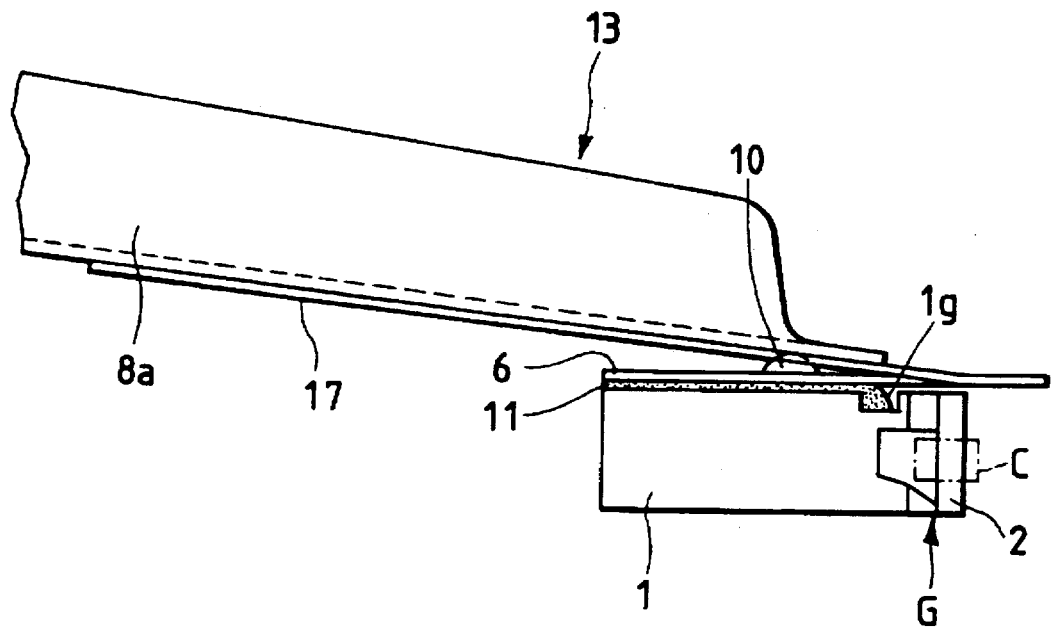
FIG. 13 is a partial side view illustrating a conventional construction for obstructing the flow of the bonding agent in the floating type magnetic head apparatus.
Figure 14:
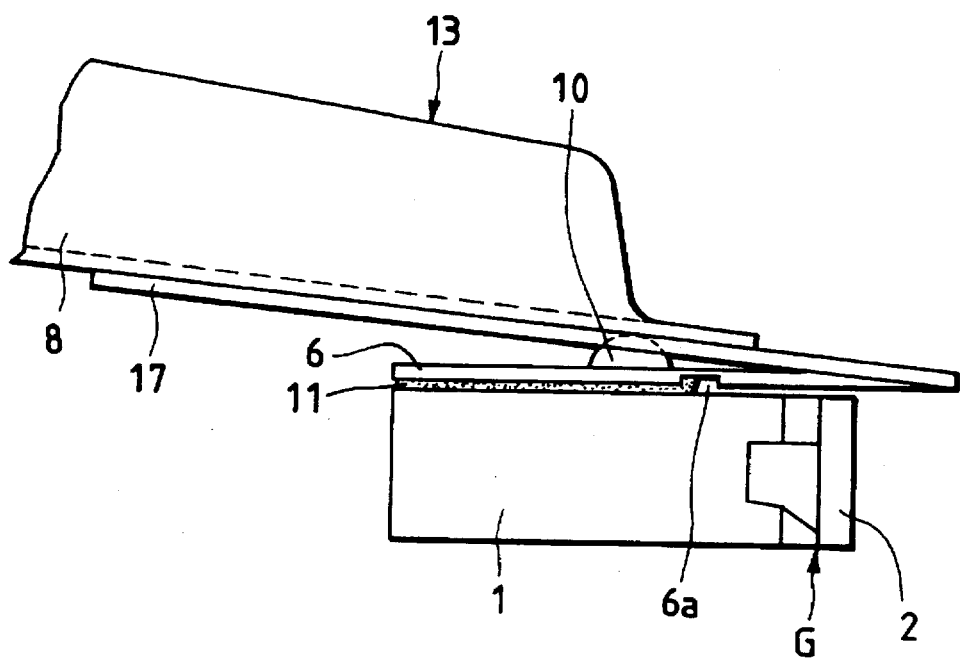
FIG. 14 is a partial side view illustrating a conventional construction for obstructing the flow of the bonding agent in the floating type magnetic head apparatus.

In a support mechanism 3 shown in FIG. 1, a flexure 7 is fixed to the tip (free end) 8c of a load beam 8 by means such as laser welding in the same way as in the prior art shown in FIGS. 10 and 12. The flexure 7 is formed by cutting out a stainless-steel sheet member having a thickness of 38 µm in an etching step. As shown in the plan view of FIG. 3, a circular hole 7a is formed in the back end of the flexure 7. The circular hole 7a is made to correspond to a circular hole provided in the load beam 8 so that the load beam 8 is registered. The flexure 7 includes a cantilevered portion 7e extending from the tip 8c of the load beam 8.

A groove 7b in the shape of a nearly sideways U is formed in the tip portion of the flexure 7, and the portion surrounded by the groove 7b is formed into a tongue piece 16. Further, a window 7c is formed in the tip of the flexure 7. The core 2 of the magnetic head is positioned below the window 7c.

As illustrated perspectively in FIG. 2, the tongue piece 16 includes a first portion 16e formed on the cantilevered portion 7e and extends along the flexure 7 toward the base 8b (see FIG. 11 for reference) of the load beam 8. The first portion 16e has a back edge 16f. The tongue piece 16 also includes a bonding (second) portion 16c having a front edge 16b. A spherical projection 10 for pivotal support is protrusively formed between the back edge 16f of the first portion 16e and the front edge 16b of the bonding portion 16c at a position slightly more toward the tip (to the right in the figure) of the tongue piece 16 than the center thereof. Non-contact portions gaps 16a and 16a which are continuous with both side portions of the projection 10 and extend along the width of the tongue piece are formed in the tongue piece 16.

The circular hole 7a, the groove 7b, and the window 7c of the flexure 7, and also the non-contact portions 16a and 16a are formed at the same time when the outer shape of the flexure 7 is cut out by etching from a plate member. The projection 10 is protrusively formed by a press step after the etching step, and step differences 7d and 7d shown in FIG. 2 are formed by the press step at the same time. As a result, the tongue piece 16 is protruded slightly more toward the magnetic head than the main body of the flexure 7.

Since the non-contact portions 16a and 16a are formed continuously with both side portions of the projection 10 in the tongue piece 16, the top surface of the slider 1 does not contact the tongue piece 16 along the width of the slider in the interior space of the projection 10 and at positions of the non-contact portions 16a and 16a on both sides of the projection 10 in a state in which the slider 1 of the magnetic head is brought into contact with the lower surface of the tongue piece 16. The portion opposite to the core 2 is a bonding portion 16c with the slider 1 with the projection 10 and the portion where the tongue piece 16 are formed as a boundary.

In the embodiment shown in FIG. 3, the width dimension of the non-contact portions 16a and 16a is approximately 0.3 mm. When the magnetic head is bonded to the bonding portion 16c of the tongue piece 16, registration is performed so that the back end surface in of the slider 1 and the center of the circular hole 7a become predetermined dimensions. Therefore, the actual bonding area is the area surrounded by the back end surface 1n of the slider 1, edge portions 16b and 16b of the non-contact portions 16a and 16a, and an outer rim 10a of the projection 10. The distance X from the back end surface 1n of the slider 1 to the edge portion 16b of the non-contact portion 16a is, for example, 1.45 mm.

Figure 11:
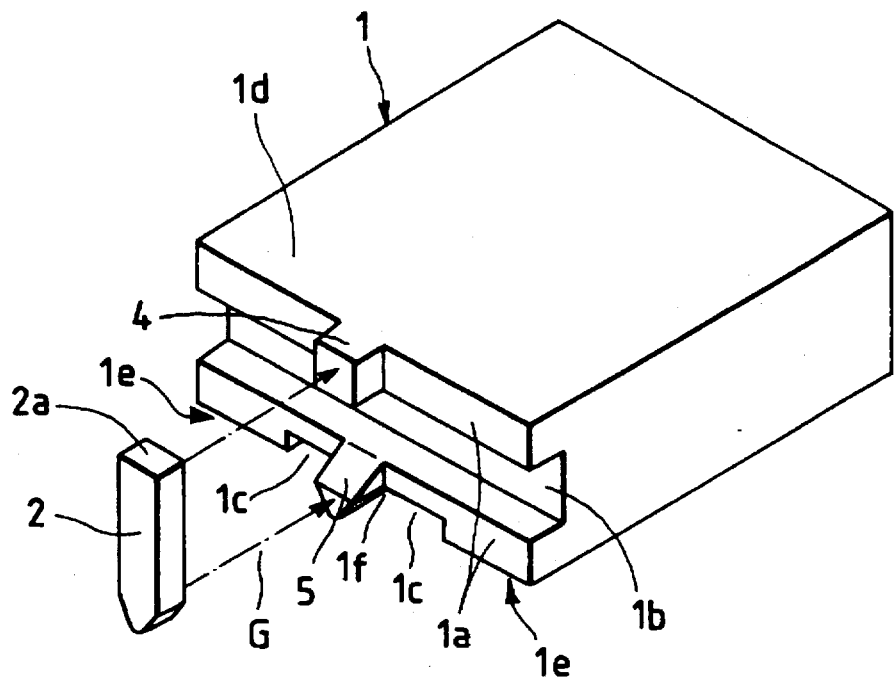
FIG. 11 is an exploded perspective view illustrating a slider and a core of the magnetic head.

The construction of the magnetic head bonded to the tongue piece 16 is the same as that shown in FIG. 11. As shown in FIG. 1, the bonding agent 11 is provided between the bonding portion 16c of the tongue piece 16 and the slider 1 so that they are bonded. However, the flow of the bonding agent 11 is obstructed by the interior space of the projection 10 and the non-contact portions 16a and 16a, and the bonding agent 11 does not further flow toward the core 2.

Therefore, the bonding agent 11 does not flow to the tip portion of the slider 1 and the vicinity of the core 2. The core 2 is not deformed due to the expansion and contraction of the hardened bonding agent 11. Since the bonding area is within the range of the above-mentioned dimension X, a strong bending stress does not act on the slider 1 due to the expansion and contraction of the hardened bonding agent, making it difficult for the amount h of the protuberance of the crown to vary.

In a second embodiment shown in FIG. 4, first and second bent structures 16g are connected between the back edge 16f of the first portion 16e and the front edge 16b of the bonding portion 16c, and are positioned at both sides of the projection 10. The first and second bent structures 16g have concave surfaces facing in a downward direction (i.e., away from the flexure 8), and non-contact portions (grooves) 16d and 16d are formed by the first and second bent structures 16g. The first and second bent structures 16g can be protrusively molded by a press step together with the projection 10. In this embodiment, the interior space of the projection 10 is connected to the interior space of the non-contact portions 16d and 16d, and the interior space is separated from the top surface of the slider 1. Therefore, the bonding agent 11 provided between the bonding portion 16c and the slider 1 is obstructed by the projection 10 and the non-contact portions 16d and 16d, thereby regulating the bonding area.

At this point, an actual bonding operation was performed to check the deformed state of the magnetic head in the floating type magnetic head apparatus of the first embodiment having the above-described construction. This experiment showed that if the distance between the back end surface 1n of the slider 1 and the non-contact portion 16a varies and the area of the bonding area varies, the deformed state in the vicinity of core 2 and the protuberance dimension of the crown vary in response to that change.

FIGS. 5 to 8 are diagrams illustrating the results of these tests. In these figures, X in the horizontal axis indicates the distance (mm) from the back end surface 1n of the slider 1 to the edge portion 16b of the non-contact portion 16a. Each measured result is indicated by "□" in FIGS. 5 to 8.

The main dimensions of the floating type magnetic head apparatus of the present invention used in the test are described below.

Figure 9:
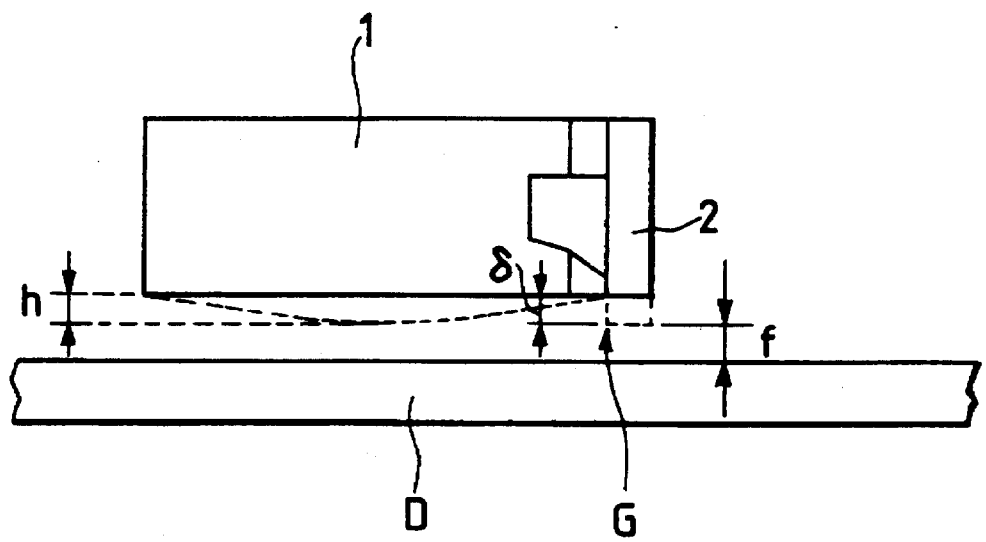
FIG. 9 is a side view illustrating a state in which the dimension of each section of the magnetic head is varied.

The length L1 from the back end surface 1n of the slider 1 to the tip of the core 2 is 3.1 mm; the length L2 from the back end of the slider 1 to the gap G is 2.9 mm; the width W1 of the slider is approximately 2.2 mm; the thickness H of the slider 1 is 0.61 mm; and the protuberance h (see FIG. 9) of the crown is 45 nm. The material of the slider 1 is Mn-zn ferrite type.

The width Wa of the bonding portion 16c of the tongue piece 16 of the flexure 7 is approximately 1 mm; the width of the non-contact portion 16a is 0.3 mm; and the diameter of the projection 10 is approximately 0.6 mm.

[Temperature characteristic test]

FIGS. 6 and 7 show the results of a temperature characteristic test.

In this test, a plurality of flexures 7 such that the positions of the projection 10 and the non-contact portion 16a were changed were produced without changing the relative positions of the projection 10 and the non-contact portion 16a in the tongue piece 16. The slider 1 was positioned always at the same position and bonded to the bonding portion 16c of the tongue piece 16 of each flexure 7. A plurality of types of floating type magnetic head apparatuses having different X values described above were produced, and each of them was used as a test sample.

Each of the test samples was installed in a test disk apparatus in which a glass disk is rotating, and a disk D (see FIG. 9) was rotated under an environment of room temperature (23° C.). Under this condition, the distance from the surface of the disk D from the gap G, the distance from each of the end portions along the length of the rail surface 1e of the slider 1 to the surface of the disk D, and the distance from the center of the rail surface 1e to the surface of the disk D were measured by an optical measuring apparatus.

Next, the same measurement as described above was made in a condition in which the disk apparatus was placed under an environment of a high temperature (55° C.) and the disk D was rotated.

Initially, the difference between the amount of floating of the magnetic gap G from the surface of the disk D at a high temperature and the amount thereof at room temperature was determined. In the vertical axis in FIG. 5, the difference between the floating amounts is shown in such a way that it is converted into the difference between the amount of a change (nm) in the protuberance dimension δ (see FIG. 9) of the gap G from a rail surface 1f of the slider 1, i.e., the protuberance dimension δ of the magnetic gap G from the rail surface 1f at a high temperature and the protuberance dimension δ of the magnetic gap G at room temperature. The positive side of the values on the vertical axis in FIG. 5 indicates that as a result of reaching a high temperature, the gap G varies so that the protuberance dimension δ from the rail surface 1f increases, and the negative side indicates that as a result of reaching a high temperature, conversely, the gap G varies in a direction in which it retracts toward the slider 1.

It is clear from the results shown in FIG. 5 that the amount of change of the protuberance dimension δ of the magnetic gap increases gradually from when the value of X exceeds around 1.5 mm, and when X exceeds 2.0 mm, the amount of change of the protuberance dimension δ increases sharply. This means that the deformation of the hardened bonding agent is likely to work as a deformation stress for the core 2 because when the value of X increases, the bonding area comes closer to the core 2, and the core 2 is deformed toward the disk due to the expansion of the bonding agent and the protuberance dimension of the magnetic gap G increases in a high temperature environment.

FIG. 6 shows the amount of change in the protuberance dimension h of the crown. The protuberance dimension h is determined by subtracting the measured value of the distance from the end portions of the rail surfaces 1e to the disk surface from the measured value of the distance from the central portion of the rail surfaces 1e to the disk surface. The negative side of the vertical axis in FIG. 6 indicates that the protuberance dimension h of the crown decreased as a result of reaching a high temperature, and the positive side indicates that the protuberance dimension h of the crown increased.

It is clear from the results shown in FIG. 6 that the amount of change in the protuberance dimension h of the crown decreases further when X exceeds 1.5 mm. This means that when the value of X exceeds 1.5 mm and the bonding area becomes larger, the slider 1 becomes likely to bend and be deformed so as for it to form a protruded shape toward the tongue piece 16 in a high temperature environment, and as a result the protuberance dimension h of the crown decreases.

It can be confirmed from the results of FIGS. 5 and 6 that it is possible to limit the variation in the protuberance position of the magnetic gap G in a high temperature environment when the value of X is less than 1.5 mm, and also the protuberance dimension h of the crown varies little. Although an example in which X is 1.45 mm is described in the embodiment shown in FIG. 1, it can be seen that the area of the bonding area is most appropriate in this example.

[Heat resistance test]

FIGS. 7 and 8 shows the results of a heat resistance test.

In this test, in the same way as in the above-described temperature characteristic test, a plurality of floating type magnetic head apparatuses having different values of X were produced without varying the relative positions of the projection 10 and the non-contact portions 16a and 16a, and used as test samples.

Each of these samples was installed in a test disk apparatus, and a glass disk was rotated at room temperature (23° C.). Under this condition, the amount of floating from the surface of the disk D at the same places as in the above-described temperature characteristic test, i.e., the magnetic gap G, the two end portions along the length of the rail surfaces 1e, and the central portion of the rail surfaces 1e from the surface of the disk D, were measured. Next, the respective test samples were left for 20 hours in a high temperature environment of 100° C. until it cooled to room temperature, after which the respective test samples were installed in the disk apparatus. The amount of floating at the same positions as described above from the disk surface were measured while the glass disk was rotated in a room temperature environment.

FIG. 7 shows the difference between the floating dimension f (see FIG. 9) of the magnetic gap G after the heat resistance test and the floating dimension f of the magnetic gap G at room temperature in units of nm on the vertical axis.

FIG. 7 indicates that when the amount of change of the floating dimension f, shown on the vertical axis, increases further, the magnetic gap G is displaced in a direction the magnetic gap G retracts toward the slider in the magnetic head after the heat resistance test, and when the amount of change on the vertical axis decreases further, the magnetic gap G varies in a direction the magnetic gap G protrudes from the rail surface 1f of the slider 1 after the heat resistance test after the heat resistance test.

The test results shown in FIG. 7 indicates that when X exceeds 2.0 mm, the amount of change in the floating dimension f increases further. That is, when the dimension of X is increased and the bonding area becomes larger, the bonding agent is present near the core 2, exerting an influence upon the deformation of the core. Therefore, as a result of being cooled at room temperature after being left in a high temperature environment, the hardened bonding agent contracts and the core 2 is pulled in a direction in which it is separated from the disk.

The vertical axis in FIG. 8 indicates the difference between the protuberance dimension h of the crown after the heat resistance test and the protuberance dimension h of the crown at room temperature on the basis of the measured value of the amount of floatings at three places of the rail surface 1e. The positive side of the vertical axis in FIG. 8 indicates that the protuberance dimension h of the crown has increased after the heat resistance test.

It is clear from the results in FIG. 8 that when the value of X increases to exceed 2.0 mm, the protuberance dimension h of the crown increases after the heat resistance test. That is, when the dimension of X is increased and the bonding area becomes larger, the slider 1 becomes likely to be deformed in a recessed shape toward the tongue piece 16 due to the contraction of the bonding agent from when it is at a high temperature to the time when it is cooled to a room temperature.

The results of FIGS. 7 and 8 reveal that a permanent change in the amount of protuberance of the magnetic gap G and a permanent dimension change in the crown occur little even in use in a high temperature environment by setting the value of X at less than 2.0 mm. The temperature characteristic test shown in FIGS. 5 and 6 shows that it is preferable that value of X be 1.5 mm or less. However, the temperature characteristic test shown in FIGS. 7 and 8 shows that the value of X can be increased to approximately 2.0 mm in an actual apparatus because a permanent deformation of the slider or core does not occur.

[Bonding strength test]

Next, the slider 1 was forcibly peeled off from the tongue piece 16 for a sample used for each of the above-described tests, and the peel strength (g) at that time was measured. As a result, the peel strength of the sample having the value of X of 1 mm was 40 g, and that of the sample having the value of X less than 1 mm was less than 40 g. It is considered that the bonding strength of 40 g is a limit in this type of magnetic head apparatus. Therefore, the lower limit value of X is preferably 1.0 mm. It was confirmed that a bonding strength of 50 g or more could be obtained for the sample having the value of X of 1.45 mm, shown as an example of the embodiment, in the peel test.

Based on the above, the range of the value of X is preferably from 1 mm to 2.0 mm, and more preferably from 1.0 mm to 1.5 mm on the basis of the results of the bonding strength test and the heat resistance test.

Although in the above-described embodiments the center of the spherical projection 10 coincides with the center line of the non-contact portion 16a or 16d, the non-contact portions 16a and 16b may deviate from the projection 10 if the non-contact portion 16a or 16d is connected to the interior space of the projection 10.

A bulk type monolithic head shown in FIG. 11 is used as the magnetic head in the embodiment of the present invention. However, in addition to the magnetic head used in this embodiment, in a magnetic head in which a magnetic conversion element is formed on one end surface of the slider by thin film formation technology, there is an influence exerted by the bonding agent in the same way as in a case in which a core is mounted in the slider shown in the embodiment. The influence exerted by the bonding agent can be eliminated by using a flexure described in the present invention.

According to the present invention, as described above, since a non-contact portion with a slider is provided in a portion which is continuous with a projection portion of a tongue piece in order to regulate the bonding area by the projection portion and the non-contact portion, complex operations such as forming a recess portion in the slider or etching a recess portion in the tongue piece, are not necessary. That is, since the non-contact portion can be cut out together with the outer shape of the tongue piece, or pressed together with the projection portion, a special operation for providing a non-contact portion is unnecessary. In addition, even if the non-contact portion is cut out, the strength of the tongue piece is not decreased because the projection portion is provided.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A floating type magnetic head apparatus comprising:
   a load beam having a base portion and a free end;
   a flexure connected to the load beam, the flexure having a cantilevered portion extending from the free end of the load beam, a portion of the flexure forming a tongue piece, the tongue piece including:
      a first portion formed on the cantilevered portion and extending toward the base portion of the load beam, the first portion having a back edge,
      a protrusion having an outer edge connected to the back edge of the first portion, the protrusion having a convex surface contacting the load beam adjacent the free end, thereby bending the tongue piece away from the load beam, and
      a second portion having a front edge connected to the outer edge of the protrusion; and
   a magnetic head bonded to the second portion of the tongue piece by a bonding agent;
   wherein gaps are formed between the front edge of the second portion and the back edge of the first portion, the gaps being located on opposite sides of the protrusion, the gaps aligning with the protrusion to form a non-contact portion between the flexure and the magnetic head such that flow of the bonding agent from the second portion toward the first portion is obstructed by the gaps and the interior space.

2. A floating type magnetic head apparatus comprising:
   a load beam having a base portion and a free end;
   a flexure connected to the load beam, the flexure having a cantilevered portion extending from the free end of the load beam, a portion of the flexure forming a tongue piece, the tongue piece including:
   a first portion formed on the cantilevered portion and extending in a first direction toward the base portion of the load beam, the first portion having a back edge;
   a protrusion connected to the back edge of the first portion, the protrusion contacting the load beam adjacent the free end such that the tongue piece is bent away from the load beam,
   a second portion having a front edge connected to the protrusion, and
   first and second bent structures connected between the back edge of the first portion and the front edge of the second portion, the first and second bent structures having a concave surface facing away from the flexure, the first and second bent structures being aligned in a second direction perpendicular to the first direction and intersecting the protrusion such that a groove is formed along the first bent structure, through the protrusion, and along the second bent structure; and
   a magnetic head bonded to the second portion of the tongue piece.

* * * * *